W. S. WOOD.
Handles for Burial-Cases.

No. 156,522.  Patented Nov. 3, 1874.

WITNESSES:
A. W. Almquist
A. F. Terry

INVENTOR:
W. S. Wood
BY
ATTORNEYS.

UNITED STATES PATENT OFFICE.

WILLIAM S. WOOD, OF NEWTOWN, NEW YORK.

IMPROVEMENT IN HANDLES FOR BURIAL-CASES.

Specification forming part of Letters Patent No. 156,522, dated November 3, 1874; application filed September 19, 1874.

CASE C.

*To all whom it may concern:*

Be it known that I, WILLIAM S. WOOD, of Newtown, Queens county, New York, have invented a new and useful Improvement in Handles for Burial-Cases, of which the following is a specification:

The invention will first be fully described, and then pointed out in the claims.

Figure 1:
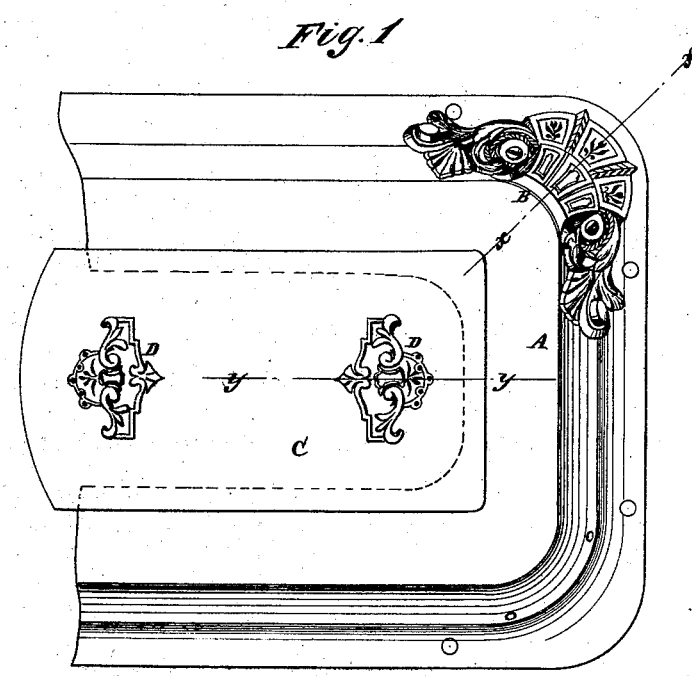
Figure 2:
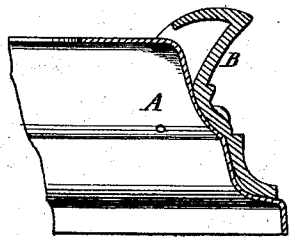
Figure 3:

Figure 1 is a top view of one end of the lid of a burial-case; Fig. 2, a vertical section of one of the handles.

A is the lid, and B the rivet-fastened handle. The latter is attached to rounded or angled corners of the lid, so that there will be two handles at each end, and so that thus the lid can readily be lifted and adjusted by two persons. The operation is thus greatly facilitated, and a decided advantage obtained.

Having thus described all that is necessary to a full understanding of my invention, what I claim is—

A burial-case lid, provided with handles B, one arranged on each of the curved or angled corners, as and for the purpose described.

WILLIAM S. WOOD.

Witnesses:
T. B. MOSHER,
ALEX. F. ROBERTS.